US006169261B1

(12) United States Patent
Li et al.

(10) Patent No.: US 6,169,261 B1
(45) Date of Patent: Jan. 2, 2001

(54) APPARATUS AND METHOD FOR GENERATING AN ELECTRIC DISCHARGE FOR USE IN THE LINE CUTTING OF A WORKPIECE

(75) Inventors: Hsi-Pin Li, Hsinchu; Hsiang Kuo Lee, Chungli; Yea-June Day, Hsinchu, all of (TW)

(73) Assignees: Industrial Technology Research Institute, Hsinchu; ARD Precision Machinery Co., Ltd., Taipei County, both of (TW)

( * ) Notice: Under 35 U.S.C. 154(b), the term of this patent shall be extended for 0 days.

(21) Appl. No.: 09/096,374

(22) Filed: Jun. 12, 1998

(51) Int. Cl.[7] .............................. B23H 1/02; B23H 7/16

(52) U.S. Cl. .............................. 219/69.13; 219/69.18; 219/69.19

(58) Field of Search .............................. 219/69.13, 69.18

(56) References Cited

U.S. PATENT DOCUMENTS

| | | | | |
|---|---|---|---|---|
| 3,997,753 | * | 12/1976 | Inoue | 219/69.13 |
| 4,504,722 | * | 3/1985 | Kishi et al. | 219/69.18 |
| 4,806,719 | * | 2/1989 | Seerieder et al. | 219/69.13 |
| 5,064,984 | * | 11/1991 | Yamamoto et al. | 219/69.13 |
| 5,345,053 | * | 9/1994 | Kaneko et al. | 219/69.18 |
| 5,352,859 | * | 10/1994 | Kaneko et al. | 219/69.18 |
| 5,453,593 | * | 9/1995 | Seok-Yong et al. | 219/69.18 |
| 5,869,797 | * | 2/1999 | Goto et al. | 219/69.13 |

* cited by examiner

*Primary Examiner*—Geoffrey S. Evans
(74) *Attorney, Agent, or Firm*—Smith, Gambrell & Russell, LLP

(57) ABSTRACT

An apparatus and method is provided for generating an electric discharge in an alternating direction on a workpiece for line cutting of the workpiece. In particular, the apparatus and method allows the benefits of preventing the workpiece from being cut apart due to excessive power and also preventing electrolysis that can degrade the surface quality of the workpiece. The apparatus includes a negative ignition voltage source, a positive ignition voltages source, a discharging voltage source, and a pulse generator, which are constructed on an all-transistor architecture. Prior to the application of each, electric discharge, low voltages are used to detect the current discharging condition at the discharge gap between the electrode and the workpiece to thereby determine whether the current discharging conditions are normal, arc, or open-circuited, these being then used for adjustment of the power level of the discharging voltage in order to apply thereby the electric discharge onto the workpiece in an alternating direction.

2 Claims, 6 Drawing Sheets

APPARATUS AND METHOD FOR GENERATING AN ELECTRIC DISCHARGE FOR USE IN THE LINE CUTTING OF A WORKPIECE

BACKGROUND OF THE INVENTION

1. Field of the Invention

This invention relates to machine tools, and more particularly, to an apparatus and method for generating an electric discharge in an alternating direction on a workpiece for line cutting of the workpiece.

2. Description of Related Art

An electric-discharge cutting apparatus is a machine tool that can generate and apply an electric discharge onto a workpiece for line cutting of the workpiece. Conventionally, the electric-discharge cutting apparatus utilizes a DC (direct current) voltage source for ignition and arc generation. One example of such an electric-discharge cutting apparatus is shown in FIG. 1. As shown, the conventional electric-discharge cutting apparatus is used to generate and apply an electric discharge for use in the line cutting of a workpiece 5. The electric-discharge cutting apparatus includes a pulse generator 1, a high-voltage source 2, a low-voltage source 3, and an electrode 4. In more detail, the high-voltage source 2, a low-voltage source 3, and an electrode 4. In more detail, the high-voltage source 2 is composed of a DC voltage source 11 for supplying a DC voltage $V_2$ and a switch S2 10 connected to the negative end of the DC voltage source 11. The low-voltage source 3 is composed of a DC voltage source 7 for supplying a DC voltage $V_1$, a switch S1 6 connected to the negative end of the DC voltage source 7, a resistor 8, and a diode 9.

In operation, the pulse generator 1 generates a pulsed control signal that can cause the switch S1 6 to be switched into the conducing state, thereby allowing the DC voltage $V_1$ from the negative end of the voltage source 7 to be conducted successively through the switch S1 6, the resistor 8, and the diode 9 to the electrode 4. If the potential difference between the electrode 4 and the workpiece 5 is lower than a reference voltage, it indicates that the ignition is successful. After this, the pulse generator 1 turns off the switch S1 6 and then turns on the switch S2 10, allowing the voltage from the negative end of the voltage source 11 to be conducted through the switch S2 10 to the electrode 4, thereby causing the electrode 4 to generate and apply an arc onto the workpiece 5 for line cutting. After a preset period, the switch S2 10 is turned off so as to terminate the arc for a preset duration. After this, the switch S1 6 is turned on again for the next cycle of ignition.

In the low-voltage source 3, the resistor 8 is used for current-limiting purpose to prevent an excessive discharging current at the electrode 4. The diode 9 can prevent the negative voltage $V_2$ from the DC voltage source 11 from entering into the low-voltage source 3. In this electric-discharge cutting apparatus, since both the voltage source 7 in the low-voltage source 3 and the voltage source 11 in the high-voltage source 2 are DC-voltage source, the voltage applied to the electrode 4 is always negative in polarity, causing the workpiece 5 also to be always negative in polarity when the electric discharge is being applied to is. Where water is used as the insulating liquid in the operation of the workpiece 5, the workpiece 5 is subjected to electrolysis, which degrades the surface quality of the workpiece 5 and reduces the useful life of the molding.

SUMMARY OF THE INVENTION

It is therefore an objective of the present invention to provide an electric-arc cutting apparatus and method, which can generate an electric discharge based on a given ignition.

It is another objective of the present invention to provide an electric-discharge cutting apparatus and method, which can generate an electric discharge in an alternating direction so as to prevent the workpiece from being subjected to electrolysis that would otherwise occur if the electric arc is generated from DC voltage sources only.

In accordance with the foregoing and other objectives of the present invention, a new electric-discharge cutting apparatus and method is provided. The electric-discharge cutting apparatus and method of the invention, in particular, can generate and apply an electric discharge in an alternating direction onto the workpiece for line cutting of the workpiece.

The method of the invention includes the following steps of:

(1) performing a low-voltage ignition process at the discharge gap; if the total time of using the same polarity for ignition is still less than a preset time $T_4$, then using the current polarity for the next cycle of ignition is used; otherwise, the polarity is inverted to the opposite;

(2) detecting the polarity of the current low-voltage ignition; if negative, applying a negative ignition voltage to the electrode; otherwise, if positive, applying a positive ignition voltage to the electrode;

(3) detecting the gap voltage at the discharges gap based on a first reference time $T_1$ and a second reference time $T_2$ where $T_1 < T_2$, and comparing the detected gap voltage $V_{gap}$ with a preset reference voltage range between a first reference voltage $V_{ref1}$ and a second reference voltage $V_{ref2}$;

if during $T_1$ the gap voltage $V_{gap}$ is within the range between$_{Vref1}$ and $V_{ref2}$, it indicates that the discharge gap is currently operating under arc discharging conditions;

if during the period between $T_1$ and $T_2$ the gap voltage $V_{gap}$ is within the range between$_{Vref1}$ and $V_{ref2}$ it indicates that the discharge gap is currently operating under normal discharging conditions; and if beyond $T_2$ the gap voltage $V_{gap}$ is still beyond the range between$_{Vref1}$ and $V_{ref2}$, it indicates that the discharge gap is currently operating under open circuit conditions;

(4) in the event of normal or arc discharging conditions, the discharging voltage is applied to the discharge gap for a predetermined on-time, and the arc-on-time is set to be half of the normal-on-time; and after the arc discharge is completed, the discharging voltage is switched off for a predetermined off-time; and (5) in the even of open-circuited conditions, the discharging voltage to be applied is withheld from the discharge gap for an off-time $T_3$, and the polarity for the next cycle of ignition is inverted in order to apply the ignition voltage in an alternating direction.

The apparatus of the invention includes an electrode for applying an electric discharge onto the workpiece; a negative ignition voltage source for supplying a negative ignition voltage to the discharge gap between the electrode and the workpiece to test the condition thereof; a positive ignition voltage source for supplying a positive ignition voltage to the discharge gap between the electrode and the workpiece to test the condition thereof; a discharging voltage source for supply a discharging voltage to the discharge gap between the electrode and the workpiece to generate an electric discharge for line cutting of the workpiece; and a pulse generator for generating a plurality of control signals in response to the current discharging condition at the discharge gap for controlling the negative ignition voltage source; the positive ignition voltage source; and the discharging voltage source. Prior to the discharging voltage source applying a discharge voltage to the discharge gap, the negative and positive ignition voltage sources are connected to the electrode to detect whether the current discharging conditions at the discharge gap are normal, arc, or open-circuited. The power levels of the discharging voltage are then adjusted accordingly and after which the electric discharge is applied onto the workpiece in an alternating direction.

The foregoing apparatus and method of the invention can be used to generate an electric discharge in an alternating direction that allows the benefits of preventing the workpiece from being cut apart due to excessive power and also prevents the electrolysis that can degrade the surface quality of the workpiece.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
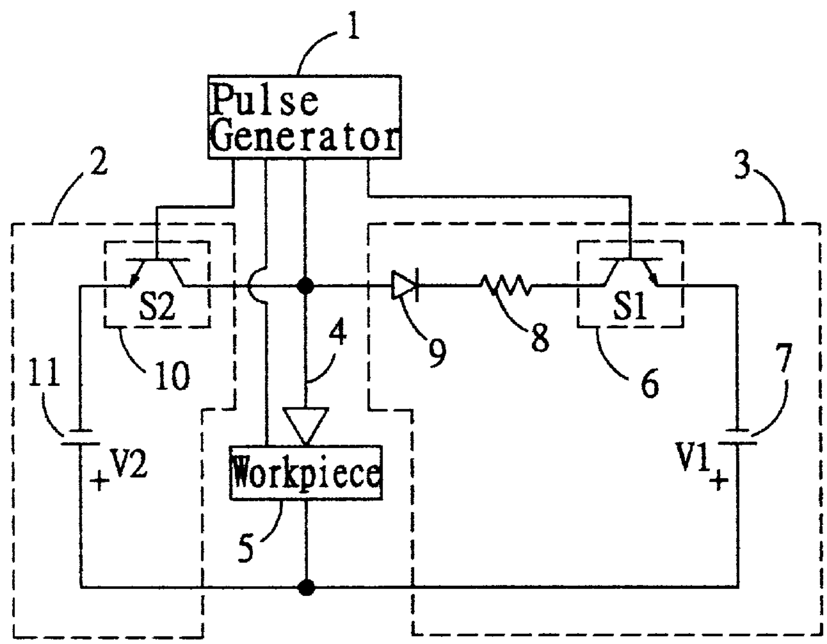
FIG. 1 is a schematic circuit diagram showing a conventional electric-discharge cutting apparatus for generating an electric discharge for use in the line cutting of a workpiece.
Figure 2:
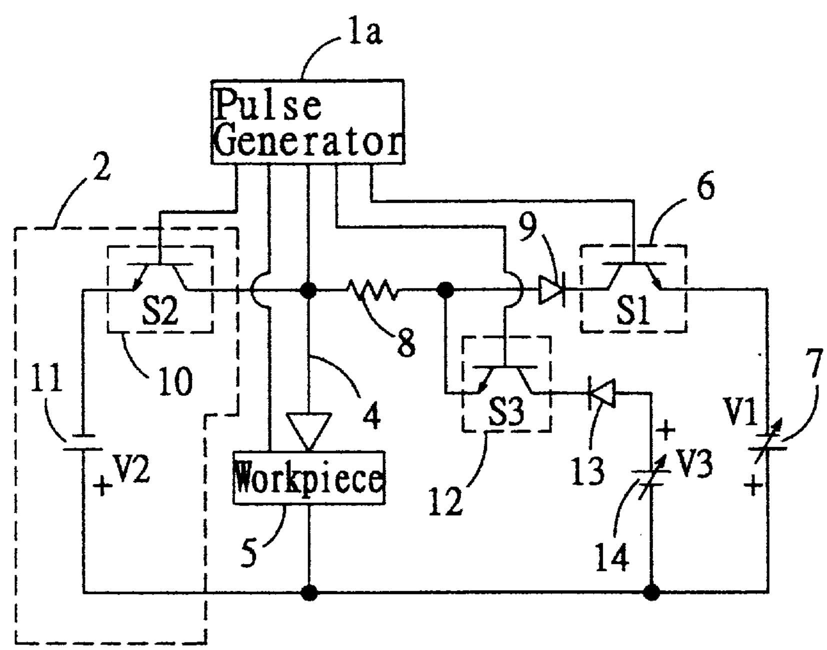
FIG. 2 is a schematic circuit diagram showing the electric-discharge cutting apparatus of the invention.

FIG. 2 is a schematic circuit diagram showing the electric-discharge cutting apparatus of the invention for generating an electric discharge for use in the line cutting of a workpiece.

As shown, the electric-discharge cutting apparatus is used to generate and apply an electric discharge for use in the line cutting of a workpiece 5. The electric-arc cutting apparatus includes a pulse generator 1*a*, a high-power discharging voltage source 2, an electrode 4, a switch S1 6, a voltage source 7 for generating a negative voltage $V_1$, a resistor 8, a diode 9, a switch S3 12, a diode 13, and a voltage source 14 for generating a positive voltage $V_3$. The voltage source 7, the switch S1 6, and the diode 9 in combination constitute a low-power negative ignition voltage source; while the voltage source 14, the diode 13, and the switch S3 12 in combination constitute a low-power positive ignition voltage source. In more detail, the high-voltage source 2 is composed of a DC voltage source 11 for supplying a DC voltage $V_2$ and a switch S2 10 connected to the negative end of the DC voltage source 11. The switch S1 6, the switch S2 10, and the switch S3 12 are respectively controlled by the control signals S1, S2, S3 shown in FIG. 6. The electric-arc cutting apparatus of the invention is constructed on an all-transistor architecture.

The method of the invention for generating an electric discharge for line cutting of the workpiece includes the following steps:

(Step 1) performing a low-voltage ignition process at the discharging gap; if the total time of using the same polarity for ignition is still less than a preset time $T_4$, then using the current polarity for the next cycle of ignition; otherwise, inverting the polarity to the opposite;

(Step 2) detecting the polarity of the current low-voltage ignition; if negative, applying a negative ignition voltage to the electrode; otherwise, if positive, applying a positive ignition voltage to the electrode;

(Step 3) detecting the gap voltage at the discharging gap based on a first reference time $T_1$ and a second reference time $T_2$, when $T_1 < T_2$, and comparing the detected gap voltage $V_{gap}$ with a preset reference voltage range between a first reference voltage $V_{ref1}$ and a second reference voltage $V_{ref2}$;

if during $T_1$ the gap voltage $V_{gap}$ is within the range between$_{vref1}$ and $V_{ref2}$, it indicates that the discharge gap is currently operating under arc discharging conditions;

if during the period between $T_1$ and $T_2$ the gap voltage $V_{gap}$ is within the range between$_{vref1}$ and $V_{ref2}$, it indicates that the discharge gap is currently operating under normal discharging conditions; and if beyond $T_2$ the gap voltage $V_{gap}$ is still beyond the range between$_{vref1}$ and $V_{ref2}$, it indicates that the discharge gap is currently operating under open-circuited conditions;

(Step 4) in the event of normal or arc discharging conditions, the discharging voltage is applied to the discharging gap for a predetermined on-time, and the arc-on-time is set to be half of the normal-on-time; and after the arc discharging is completed, the discharging voltage is switched off for a predetermined off-time; and (Step 5) in the event of open-circuited conditions, the discharging voltage to be applied is withheld from the discharge gap for an off-time $T_3$, and the polarity for the next cycle of ignition is inverted so that the ignition voltage is applied in an alternating direction.

Figure 3:
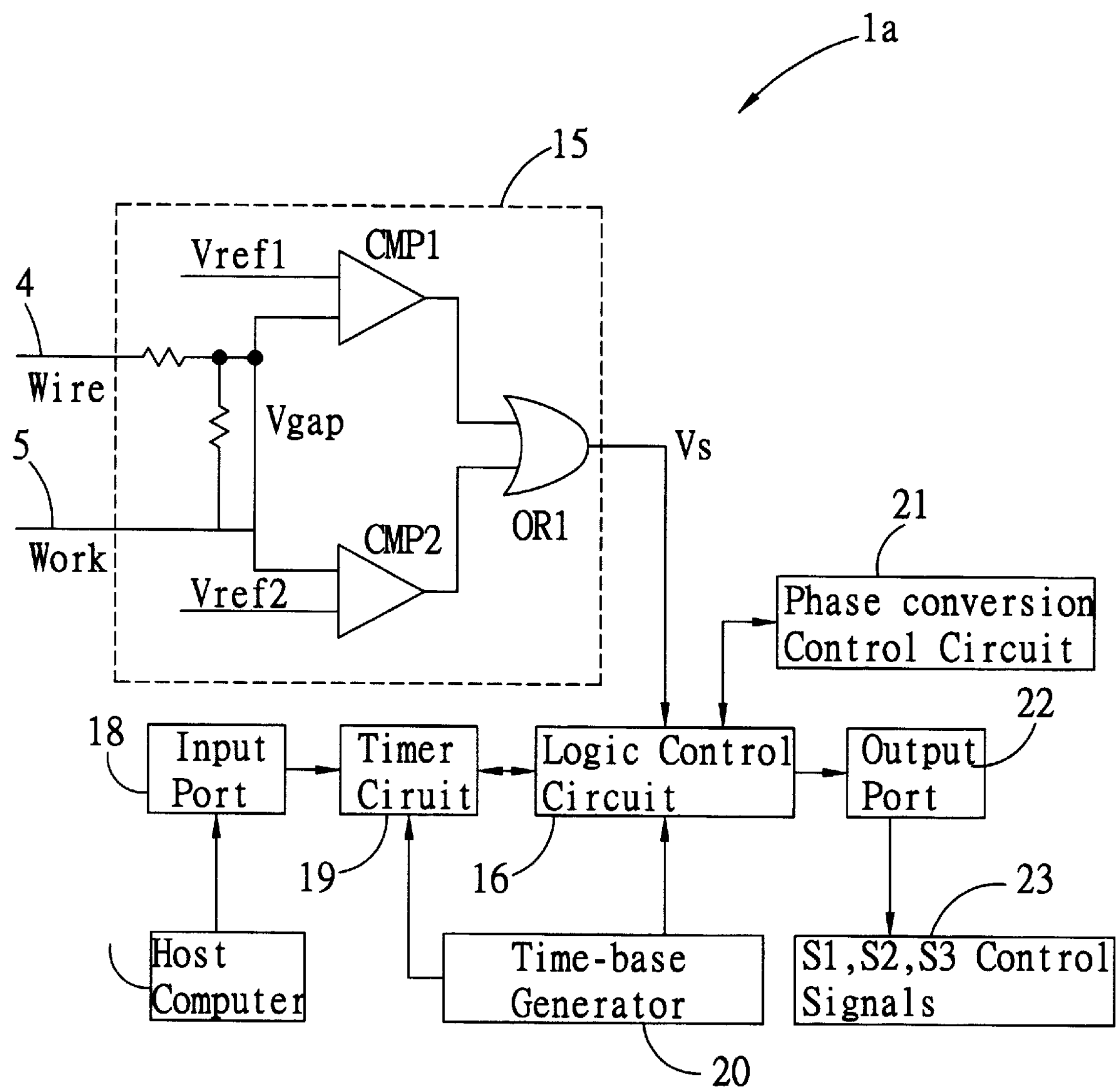
FIG. 3 is a schematic block diagram of the pulse generator utilized in the electric-discharge cutting apparatus of FIG. 2.

FIG. 3 is a schematic block diagram showing detailed circuit structure of the pulse generator 1*a* utilized in the electric-discharge cutting apparatus of FIG. 2. As shown, the pulse generator 1*a* includes a window comparator 15, a logic control circuit 16, a host computer 17, an input port 18, a timer circuit 19, a time-base generator 20, a phase-conversion control circuit 21 for low-voltage ignition, an output port 22, and a control signal generator 23. The potential difference (hereinafter referred to as gap voltage $V_{gap}$) between the electrode 4 and the workpiece 5 is fetched as a feedback signal and input to the window comparator 15.

The output signal $V_s$ from the window comparator 15 in response to the feedback signal is transferred to the logic control circuit 16. The on-time and the off-time of the discharging is controlled by the host computer 17. The timer circuit 19 is initialized by the host computer 17 via the input port 18. The time-base generator 20 is used to generate a clock signal which is referenced by the timer circuit 19 and the logic control circuit 16 for logic control of the operation of the pulse generator 1*a*. The phase-conversion control circuit 21 can determine which voltage source is to be used in each ignition cycle. The control signal generator 23 outputs the control signals S1, S2, S3 via the output port 22 for controlling the ON/OFF states of the switches 6, 10, 12.

Figure 4:
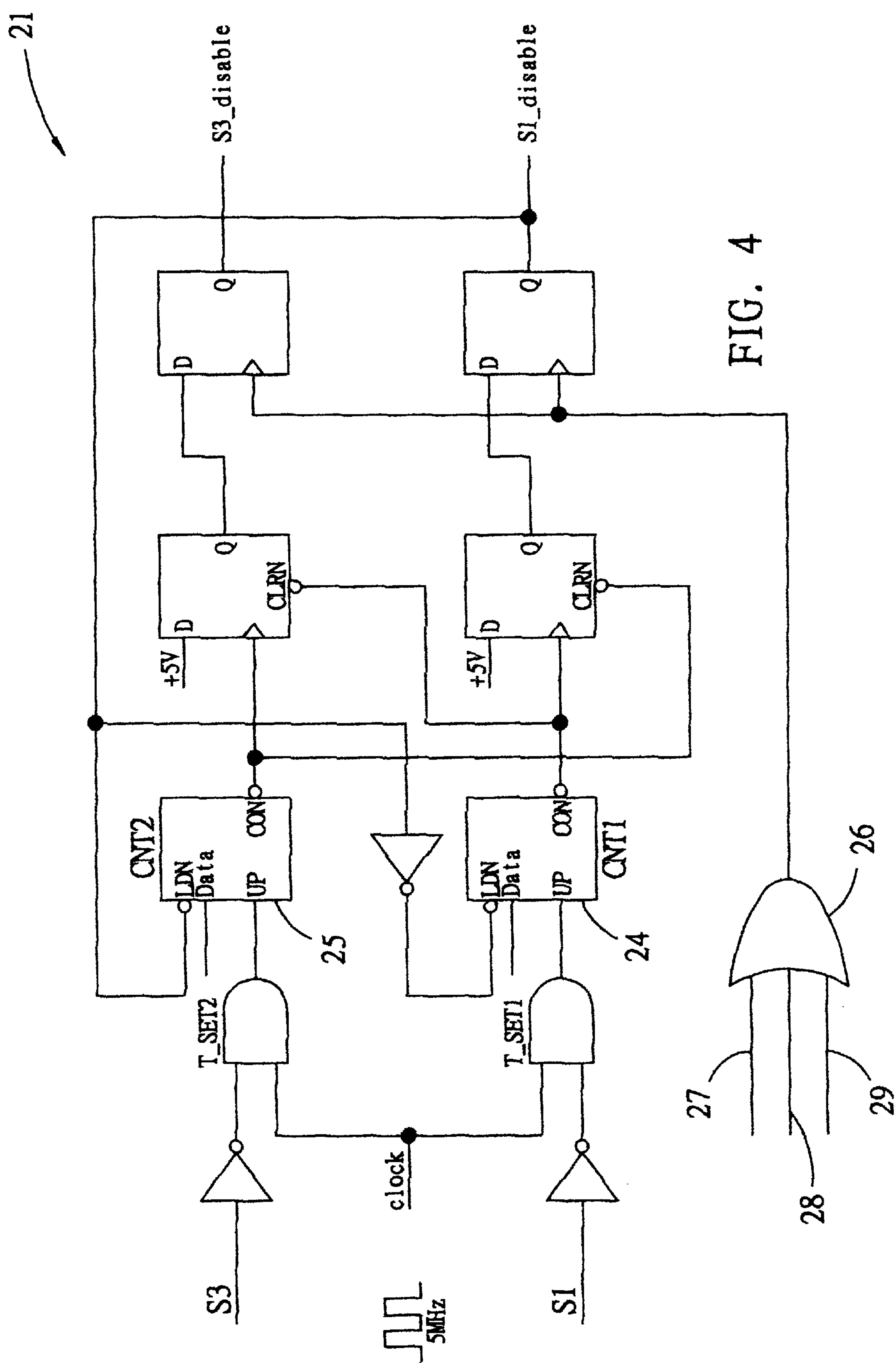
FIG. 4 is a schematic diagram showing detailed circuit structure of the phase-conversion control circuit utilized in the pulse generator of FIG. 3.

FIG. 4 is a schematic diagram showing the detailed circuit structure of the phase-conversion control circuit 21 utilized in the pulse generator 1*a* of FIG. 3. The control signal S1 for switch 6 and the control signal S3 for switch 12 are inverted and then subjected to a logic-AND operation with the 5 MHz high-frequency clock signal from the time-base generator 20 to be used to trigger the counters 24, 25. This allows the contents of the counters 24, 25 to be used to indicate the on-time of S1 and S3. The output signals S1_disable and S3_disable are respectively used to inhibit S1 and S3. The control signals T_SET1 and T_SET2 are issued by the host computer 17 and are used to set the counting period of the counters 24, 25 (typically in the range from 40 μs to 60 μs). The OR gate 26 has three inputs 27, 28, 29 respectively used to receive a first logic signal indicative of normal discharging conditions, a second logic signal indicative of arc discharging conditions, and a third logic signal indicative of open-circuited conditions.

The apparatus determines the polarity of each low-voltage ignitions from the values of S1_disable and S3_disable generated by the phase-conversion control circuit 21. If negative polarity, the switch 6 is turned ON by the control signal S1 to apply the negative voltage $V_1$ from the voltage source 7 to the electrode 4; otherwise, if positive voltage $V_3$ to the electrode 4. Meanwhile, the window comparator 15 in the pulse generator 1*a* is started to detect the gap voltage $V_{gap}$ between the electrode 4 and the workpiece 5.

If after a preset period $T_1$ (about 1 μs to 2 μs) the window comparator 15 detects that the gap voltage $V_{gap}$ is still beyond the range between the two reference voltages $V_{ref1}$ to $V_{ref2}$, it indicates that the discharging of the current cycle is an arc. After a further preset period of $T_2$, if the window comparator 15 detects that the gap voltage $V_{gap}$ is still beyond the range between $V_{ref1}$ and $V_{ref2}$, it indicates that the discharging gap remains open-circuited.

If discharging conditions are normal or arc, the switch 10 is turned ON by the control signal S2 from the pulse generator 1*a* so as to apply the high voltage $V_2$ to the electrode 4. The control signal S2 is shaped in such a manner that allows the on-time of S2 to be such that the arc-on-time is half the normal-on-time. This can prevent the workpiece from being cut apart due to excessive power. After the discharging is completed, the switch 10 is turned OFF to provide an off-time to allow the discharge gap to restore to insulated condition. In normal discharging conditions, the waveforms and timings of the signals S1, S2, S3, DMP, $V_{gap}$, and $I_{gap}$ are shown in FIG. 6; and in arc discharging conditions, the same are shown in FIG. 7.

Figure 8:
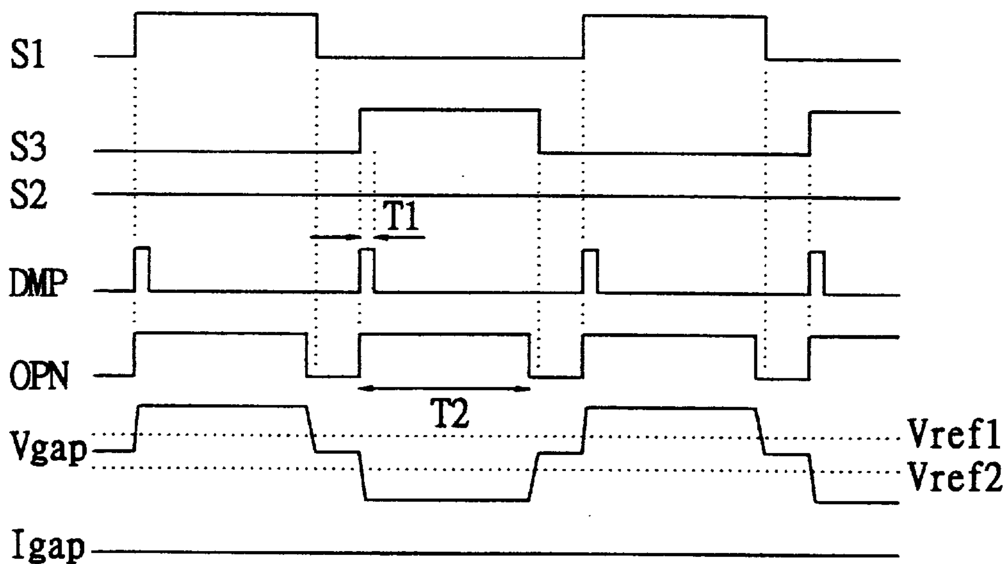
FIG. 8 is a waveform diagram showing the waveforms and timings of the various signals utilized in the electric-discharge cutting apparatus of the invention when operating under open-circuit conditions.

On the other hand, if the discharge gap is operating under open-circuited conditions, the switch 10 will remain in the OFF state for an off-time of from 4 μs to 6 μs. In open-circuited conditions, the polarity of the ignition voltage in the next ignition cycle will be inverted to the opposite. As a result, the electric arc can be applied IN an alternating direction preventing electrolysis IN the workpiece. Under open-circuited conditions, the waveforms and timings of the signals S1, S2, S3, DMP, OPN, $V_{gap}$, and $I_{gap}$ are shown in FIG. 8.

Figure 5:
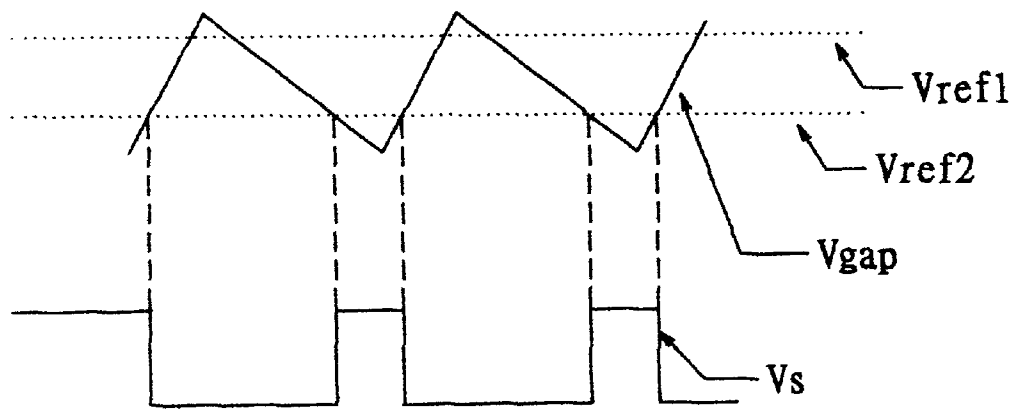
FIG. 5 is a schematic diagram used to explain the operation of the window comparator utilized in the pulse generator of FIG. 3.

FIG. 5 is a schematic diagram used to explain the operation of the window comparator 15 shown in FIG. 3. The window comparator 15 includes a first comparator CMP1 having a positive input end (+) connected to the reference voltage $V_{ref1}$ and a negative input end (−) connected to the gap voltage $V_{gap}$, and a second comparator CMP2 having a positive input end (+) connected to the gap voltage $V_{gap}$ is within the range between $V_{ref1}$ and $V_{ref2}$, it indicates that the discharging in the current cycle is arc. In the former case, if the gap voltage $V_{gap}$ is still beyond the range between $V_{ref1}$ and $V_{ref2}$, it indicates that the discharge gap remains open-circuited. The logic output $V_s$ from the window comparator 15 indicates whether the gap voltage $V_{gap}$ is within the range between $V_{ref1}$ and $V_{ref2}$ or not. This logic output $V_s$ is transferred to the logic control circuit 16 to set the logic control circuit 16 for operations in responses to the current discharging condition at the discharge gap.

Figure 6:
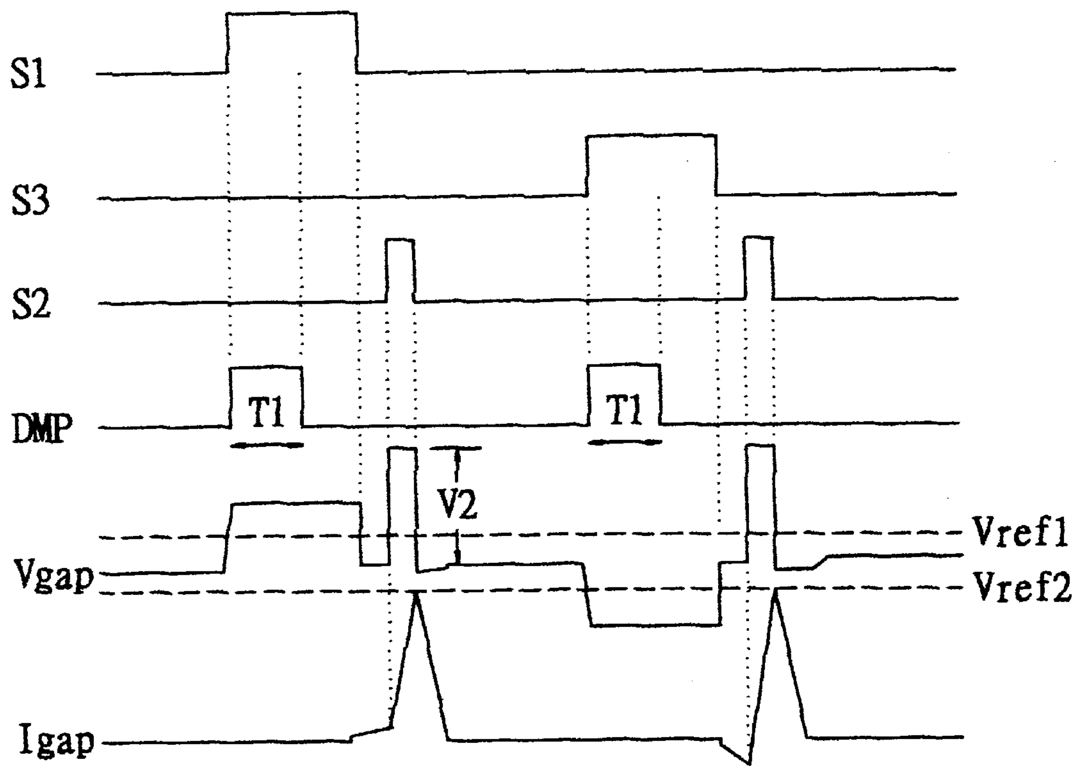
FIG. 6 is a waveform diagram showing the waveforms and timings of the various signals utilized in the electric-discharge cutting apparatus of the invention when operating under arc discharging conditions.
Figure 7:
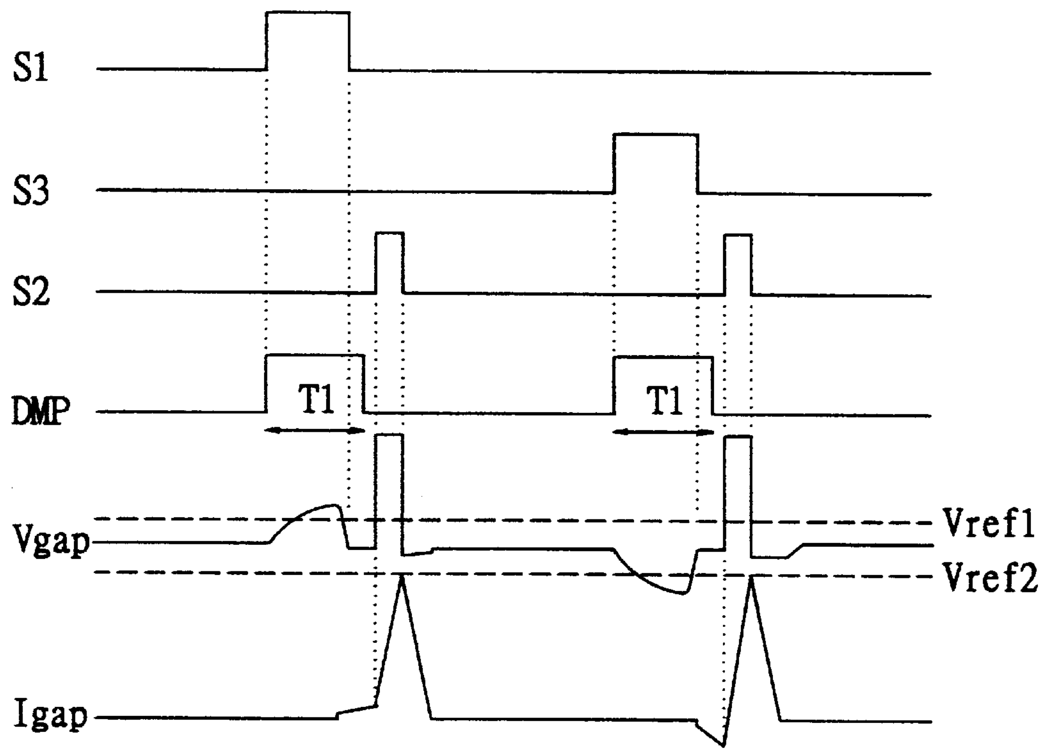
FIG. 7 is a waveform diagram showing the waveforms and timings of the various signals utilized in the electric-discharge cutting apparatus of the invention when operating under arc discharging conditions.

FIG. 6 is a waveform diagram showing the waveforms and timings of the various signals S1, S2, S3, DMP, $V_{gap}$, and $I_{gap}$ utilized in the electric-arc cutting apparatus of the invention when operating under normal discharging conditions. The signal DMP is used to initiate the generation of S1 and S3. After the switch 6 has been switched into the conducting state for a period of $T_1$, which is about the 1 μs to 2 μs, the apparatus starts to detect the gap voltage $V_{gap}$ between the electrode 4 and the workpiece 5. As mentioned earlier, if after $T_1$ the gap voltage $V_{gap}$ is beyond the range between $V_{ref1}$ and $V_{ref2}$, it indicates that the discharge in the current cycle is normal or open circuited; and thereafter when the gap voltage $V_{gap}$ is within the range between $V_{ref1}$ and $V_{ref2}$, it indicates that the discharge in the current cycle is arc. Under normal discharging conditions, the voltage $V_2$ is applied to the electrode 4, which induces a gap current $I_{gap}$ in triangular waveform across the discharge gap between the electrode 4 and the workpiece 5. After the discharge is completed, the switch 10 is switched off by S2 for an off-time to allow the discharge gap to restore to insulated condition.

FIG. 7 is a waveform diagram showing the waveforms and timings of the various signals S1, S2, S3, DMP, $V_{gap}$, and $I_{gap}$ utilized in the electric-discharge cutting apparatus of the invention when operating under arc discharging conditions. After the switch 6 has been switched on for a period of $T_1$, if the gap voltage $V_{gap}$ is detected to be within the range between $V_{ref1}$ and $V_{ref2}$, it indicates that the current discharge is a discharging arc. During the on-time, the arc-on-time is set to be half of the normal-on-time for the purpose of preventing the workpiece from being cut apart due to excessive power. After the arc discharge is completed, the control signal S2 causes the switch 10 to be switched off for an off-time to allow the discharging gap to be restored to insulated conditions.

FIG. 8 is a waveform diagram showing the waveforms and timings of the various signals S1, S2, S3, DMP, OPM, $V_{gap}$, and $I_{gap}$ utilized in the electric-discharge cutting apparatus of the invention when operating under open-circuited conditions. If after a further period of $T_2$ (which is about 40 μs to 60 μs) the gap voltage $V_{gap}$ is still beyond the range between $V_{ref1}$ and $V_{ref2}$, it indicates that the discharge gap remains open-circuited. The control signal OPM is a periodic pulse train, with each pulse existing for a period of $T_2$ and starting at the appearance of each pulse in DMP. If the current discharge is an open-circuited discharge, the switch 10 will remain in the OFF condition for an off-time of about 4 μs to 6 μs.

Figure 9:
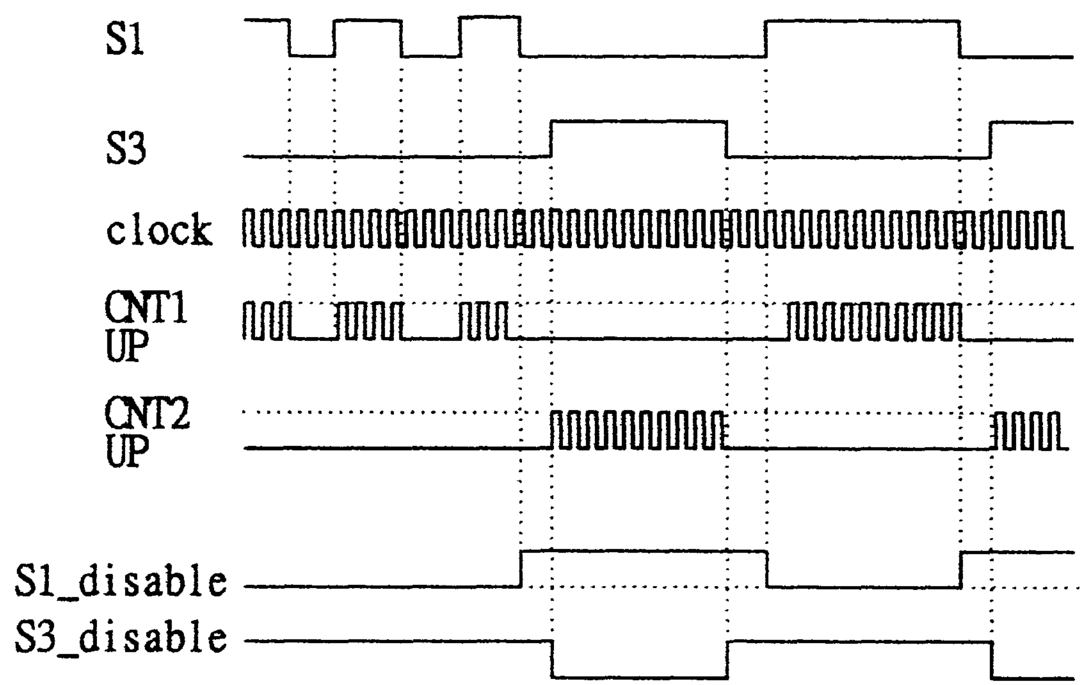
FIG. 9 is a waveform diagram showing the waveforms and timings of the various signals utilized in the phase-conversion control circuit utilized in the pulse generator of FIG. 3.

FIG. 9 is a waveform diagram showing the waveforms and timings of the various signals in the phase-conversion control circuit 21 of FIG. 4, ie., S1; S3; the clock signal; CNT1 UP; CNT2 UP; S1_disable; and S3_disable. In the low-voltage ignition process, the process time is recorded. If the total time of using the same polarity for ignition is still less than a preset time, for example from 40 μs to 60 μs, the next cycle of ignition can still use the current polarity; otherwise, the polarity will be inverted to the opposite. In this case, S1_disable is switched to the active state and S3_disable is switched to the inactive state, allowing the ignition voltage to be varied alternately. The time is recorded by the counter CNT2 25.

In the electric-discharge cutting apparatus of the invention, the ignition voltage $V_1$ and $V_3$ (FIG. 2) and the ignition count time T_SET1 and T_SET2 (FIG. 4) are all adjustable in value. Preferably, $V_1=V_3$ and T_SET1=T_SET2, which will make the average voltage of the ignition zero. To further assure that electrolysis is prevented, the settings $V_1>V_3$ and T_SET1>T_SET2 can be made.

In conclusion, the apparatus and method of the invention can be used to generate an electric discharge in an alternating direction that allows the benefits of preventing the workpiece from being cut apart due to excessive power and also preventing the electrolysis that can degrade the surface quality of the workpiece.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for generating an electric discharge for use in the line cutting of a workpiece, comprising the steps of:

(1) performing a low-voltage ignition process at the discharge gap; if the total time of using the same polarity for ignition is still less than a preset time $T_4$, then the current polarity for the next cycle of ignition is used; otherwise, inverting the polarity to the opposite;

(2) detecting the polarity of the current low-voltage ignition; if negative, applying a negative ignition voltage to the electrode; otherwise, if positive, applying a positive ignition voltage to the electrode;

(3) detecting the gap voltage at the discharge gap based on a first reference time $T_1$ and a second reference time $T_2$, where $T_1<T_2$, and comparing the detected gap voltage $V_{gap}$ with a preset reference voltage range between a first reference voltage $V_{ref1}$ and a second reference voltage $V_{ref2}$;

if during $T_1$ the gap voltage $V_{gap}$ is within the range between $V_{ref1}$ and $V_{ref2}$, the indication is that the discharge gap is currently operating under arc discharging conditions;

if during the period between $T_1$ and $T_2$ the gap voltage $V_{gap}$ is within the range between $V_{ref1}$ and $V_{ref2}$, the indication is that the discharge gap is currently operating under normal discharging conditions; and if beyond $T_2$ the gap voltage $V_{gap}$ is still beyond the range between $V_{ref1}$ and $V_{ref2}$, the indication is that the discharge gap is currently operating under open-circuited conditions;

(4) in the event of either normal or arc discharging conditions, applying the discharging voltage to the discharge gap for a predetermined on-time, and setting the arc-on-time to be half of the normal-on-time; and after the arc discharging is completed, switching off the discharging voltage for a predetermined off-time; and (5) in the event of open-circuited conditions, withholding the discharging voltage to be applied to the discharge gap for an off-time $T_3$, and inverting the polarity for the next cycle of ignition where the ignition voltage is to be applied in an alternating direction.

2. The method of claim 1, wherein $T_1$ is set in the range from 1 μs to 2 μs; $T_2$ is set in the range from 40 μs to 60 μs; $T_3$ is set in the range from 4 μs to 6 μs; and $T_4$ is set in the range from 40 μs to 60 μs.

* * * * *